United States Patent
Ionescu et al.

(10) Patent No.: US 8,761,307 B1
(45) Date of Patent: Jun. 24, 2014

(54) LOW-POWER NARROW AND WIDE BAND RECEIVER SYSTEM

(75) Inventors: Dumitru Mihai Ionescu, San Diego, CA (US); Ivan Krivokapic, San Diego, CA (US); Abu Amanullah, San Diego, CA (US); Haidong Zhu, San Diego, CA (US); Lichung Chu, San Diego, CA (US)

(73) Assignee: Olympus Corporation, Tokyo (JP)

( * ) Notice: Subject to any disclaimer, the term of this patent is extended or adjusted under 35 U.S.C. 154(b) by 252 days.

(21) Appl. No.: 13/156,105

(22) Filed: Jun. 8, 2011

(51) Int. Cl.
*H03K 9/00* (2006.01)
*H04L 27/00* (2006.01)

(52) U.S. Cl.
USPC .......................................... 375/316

(58) Field of Classification Search
USPC .................. 375/316, 340, 346, 349, 350
See application file for complete search history.

(56) References Cited

U.S. PATENT DOCUMENTS

| | | | | |
|---|---|---|---|---|
| 4,573,212 | A * | 2/1986 | Lipsky ........................... | 455/282 |
| 4,862,514 | A * | 8/1989 | Kedjierski ................. | 455/161.2 |
| 5,757,305 | A * | 5/1998 | Xydis ........................... | 341/173 |
| 5,907,799 | A * | 5/1999 | Morey ......................... | 455/336 |
| 5,949,827 | A * | 9/1999 | DeLuca et al. ................ | 375/324 |
| 6,295,461 | B1 * | 9/2001 | Palmer et al. ................ | 455/557 |
| 2004/0102172 | A1 * | 5/2004 | Hendin ........................ | 455/302 |
| 2004/0162048 | A1 * | 8/2004 | Milbar et al. ................. | 455/266 |
| 2008/0018427 | A1 * | 1/2008 | Ezra et al. .................... | 340/7.32 |
| 2008/0224895 | A1 * | 9/2008 | Krishna et al. ............... | 340/988 |
| 2008/0248766 | A1 * | 10/2008 | Rosnell et al. ............... | 455/108 |
| 2009/0199069 | A1 * | 8/2009 | Palanki et al. ................ | 714/755 |
| 2009/0298435 | A1 * | 12/2009 | Lee et al. ..................... | 455/63.1 |
| 2010/0195771 | A1 * | 8/2010 | Takahashi .................... | 375/324 |
| 2010/0197257 | A1 * | 8/2010 | Rajkotia et al. ............ | 455/188.1 |
| 2010/0210229 | A1 * | 8/2010 | Inako et al. ................ | 455/190.1 |
| 2010/0255799 | A1 * | 10/2010 | Casagrande et al. ....... | 455/160.1 |
| 2010/0316099 | A1 * | 12/2010 | Sugita et al. .................. | 375/219 |
| 2012/0231833 | A1 * | 9/2012 | Kolding et al. .............. | 455/522 |

* cited by examiner

*Primary Examiner* — Jean B Corrielus
(74) *Attorney, Agent, or Firm* — Sheppard Mullin Richter & Hampton LLP

(57) ABSTRACT

A communications device and receiver system and method to efficiently distribute functions among radio frequency (RF), analog front end (AFE) and baseband modules for ultra-low power consumption comprising a wideband receiver subsystem selectively coupled to a signal input receiving a first frequency band, a narrowband received subsystem selectively coupled to the signal input receiving a second frequency band and, a controller configured to monitor the first frequency band using the first receiver subsystem and if a wake up signal is detected using the first receiver subsystem, connect the second receiver subsystem to the signal input and tune the second receiver subsystem to a channel transmitting the wake up signal, the wake up signal including channel selection information defining the channel for subsequent communications. Wherein, the two frequency bands overlap and center on different frequencies.

20 Claims, 11 Drawing Sheets

LOW-POWER NARROW AND WIDE BAND RECEIVER SYSTEM

TECHNICAL FIELD

The present invention relates generally to communication networks, and more particularly, some embodiments relate to low-power receivers suitable for implantable medical devices.

DESCRIPTION OF THE RELATED ART

With the many continued advancements in communications technology, more and more devices are being introduced in both the consumer and commercial sectors with advanced communications capabilities. Additionally, advances in processing power and low-power consumption technologies, as well as advances in data coding techniques have led to the proliferation of wired and wireless communications capabilities on a more widespread basis.

For example, communication networks, both wired and wireless, are now commonplace in many home and office environments. Such networks allow various heretofore independent devices to share data and other information to enhance productivity or simply to improve their convenience to the user. Exemplary networks include the Bluetooth® communications network and various IEEE standards-based networks such as 802.11 and 802.16 communications networks, to name a few.

Medical device makers, recognizing benefits of wireless technology, sought to include wireless communication capability with implantable medical devices. Previous generation communication protocols for implantable devices relied on inductive communications to transfer information to and from the implanted device. Advances in low power wireless communications enabled communications without reliance on the close proximities required for communication via inductive links. Accordingly contemporary devices include a wireless transceiver at the device that communicates with a local wireless relay point or access point. The local wireless relay point can be configured to log data from the implantable device and transfer that data to a base station, such as at a health care provider facility, personal computing device or other base station. The relay point can, for example, be incorporated into a bracelet or other 'wearable' external device. Accordingly, the relay point can be provided with data storage devices, a user interface, and various communication links for communications to the base station.

In 1999 the Federal Communication Commission (FCC) standardized the communication protocols for medical device implants. The Medical Device Radiocommunications Service (MedRadio) is an ultra-low power, unlicensed, mobile radio service for transmitting data in support of diagnostic or therapeutic functions associated with implanted and body-worn medical devices. The Medical Implant Communication Service (MICS) is a specification that governs such wireless communications with medical implants.

A wireless system for implantable medical device(s) comprises at least one implanted medical device (IMD) and an external communication device (ECD). The IMD (e.g., an ICD, glucose monitor) is typically tasked with monitoring and treating physiological conditions within the human body. The ECD can be a device that is capable of communicating both with the implant and with a second device, perhaps using a different wireless system.

The combination of transmit and receive functions defines a transceiver, and must thereby be designed with the goal of keeping the power consumption of the implantable device as low as possible. This includes, but is not limited to, the design of the communication link, the RF and analog front-end (AFE) design, component modules and features, and the efficient use of sleep mode(s) that reduce, as much as possible, the time when (at least) the implantable device is active. An RF design with low-IF architecture allows a trade-off between receiver sensitivity and power consumption in the analog stages. If symmetric link designs are sought after (with respect to the transmit and receive modules) then both devices would exhibit similarly low or ultra low power consumption, while being programmable to perform both roles.

The overall power consumption exhibited by the transceiver is further influenced by factors such as protocol, regulations, device discovery and wake-up from sleep mode(s).

The operation of an IMD and ECD pair is governed by local regulations, and this includes the maximum transmission power, as well as the actions taken to initiate communication.

In one aspect, FCC regulations in US require that the ECD perform the clear channel assessment (CCA). While in other areas the IMD can send a periodic beacon, this is not the case in US.

According to FCC regulations, the ECD must monitor a MICS band channel for at least O1 ms; it may use the first unoccupied one (may use best if all occupied); the ECD must have monitored the channel it decides to use during the past 5 sec. ECD may send some control information (e.g., a flag bit indicating whether the ECD has data to send, along with channel index info bits) on some channel, for the IMD to use—should the ECD have data to send.

The IMD must do all that is necessary to respond to the ECD and receive any relevant control information in a manner that keeps power consumption as low as possible; this functionality may be assigned to a ultra low power wake-up service or module.

In the worst case, the IMD must sequentially search through the ten channels in order to receive the control message (information element) from the ECD; the design must aim to optimize the power consumed by the IMD while performing these functions.

BRIEF SUMMARY OF EMBODIMENTS OF THE INVENTION

Various embodiments of the invention provide an efficient method and transceiver architecture that combines elements to enable and facilitate the low power operation of the implantable device; the combination of design elements, features, and functionalities are efficiently distributed among RF, AFE, and baseband modules in order to exploit opportunities that can serve the goal of low or ultra low power consumption.

Other features and aspects of the invention will become apparent from the following detailed description, taken in conjunction with the accompanying drawings, which illustrate, by way of example, the features in accordance with embodiments of the invention. The summary is not intended to limit the scope of the invention, which is defined solely by the claims attached hereto.

BRIEF DESCRIPTION OF THE DRAWINGS

The present invention, in accordance with one or more various embodiments, is described in detail with reference to the following figures. The drawings are provided for purposes of illustration only and merely depict typical or example embodiments of the invention. These drawings are provided to facilitate the reader's understanding of the invention and shall not be considered limiting of the breadth, scope, or applicability of the invention. It should be noted that for clarity and ease of illustration these drawings are not necessarily made to scale.

The figures are not intended to be exhaustive or to limit the invention to the precise form disclosed. It should be understood that the invention can be practiced with modification and alteration, and that the invention be limited only by the claims and the equivalents thereof.

DETAILED DESCRIPTION OF THE EMBODIMENTS OF THE INVENTION

Figure 1:
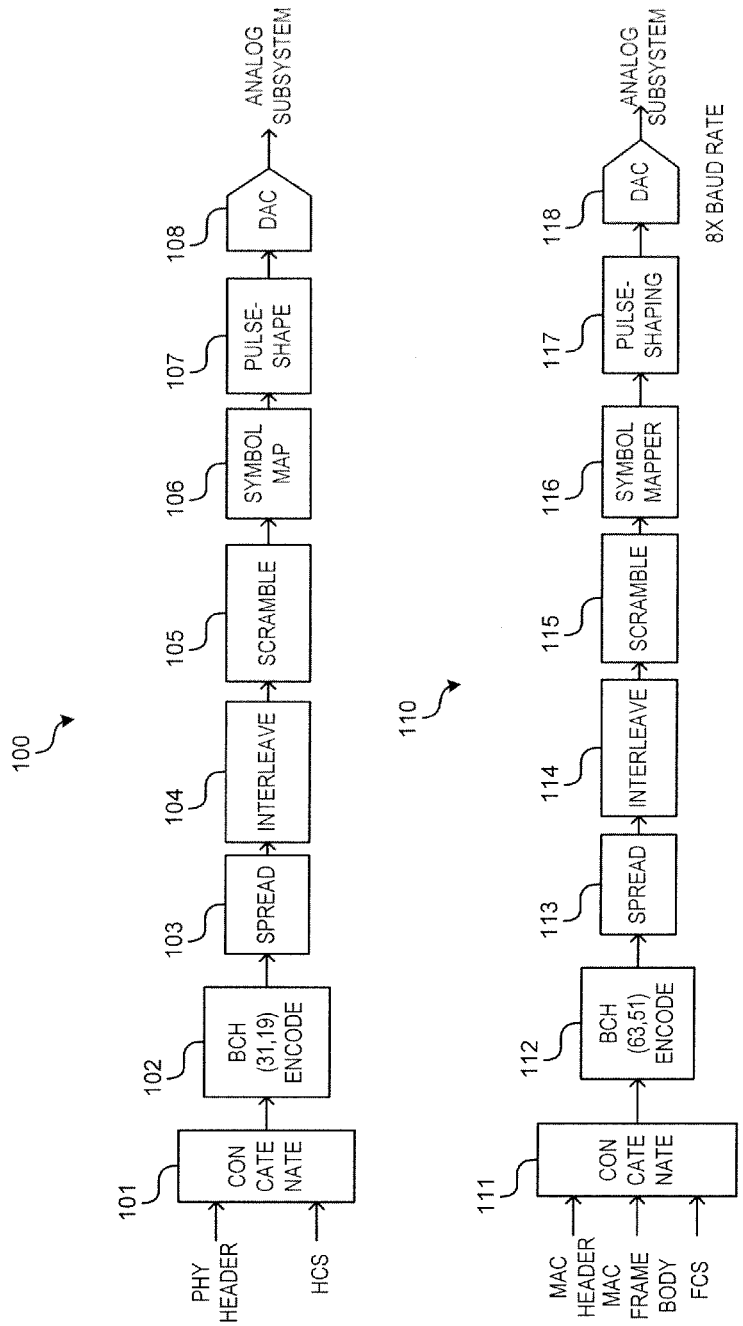
FIG. 1 illustrates a transmission process with an exemplary structure or organization of a baseband packet for transmitting signals to be received by embodiments of the invention.

FIG. 1 illustrates a transmission process with an exemplary structure or organization of a baseband packet for transmitting signals to be received by embodiments of the invention. Diagram 100 illustrates the structure and organization of a digital subsystem for generating and transmitting a physical layer convergence protocol (PLCP) packet header. PHY layer header information is concatenated 101 with a header checksum (HCS). As understood in the art, the PHY layer header information is used for communicating PHY layer information between PHY layers of devices in the network and the HCS is used for verification.

The concatenated data is encoded 102 at a forward error correcting (FEC) encoder. In the illustrated embodiment, the encoder 102 is a (31, 19) BCH encoder. In further embodiments, other BCH encoders could be employed, or more generally other algebraic FEC codes or other FEC codes. After encoding 102, the codeword symbols are spread 103, interleaved 104, and scrambled 105 in a manner known in the art. The resultant bits are mapped 106 to output symbols using a symbol mapper. For example, the symbol mapping 106 may output symbols for various modulation schemes, such as BPSK, DBPSK, double DBPSK, $$\frac{\pi}{2}$$

DBPSK, FQPSK, and SOQPSK. After mapping 106, the symbols are pulse shaped 107, for example suing a predetermined matched filter, such as an SRRC filter. After pulse shaping 107, the bits are converted to analog at DAC 108 and passed to an analog subsystem for transmission. In some implementations, the DAC 108 may oversample the data to improve reception, for example at an 8× baud rate.

Diagram 110 illustrates the structure and organization of a digital subsystem for generating a physical layer service data unit (PSDU). A MAC layer header, frame body, and frame checksum are concatenated 111 in a manner similar to the process described above with respect to the PLCP header. The concatenated information is encoded at encoder 112. In the illustrated embodiment, the PLCP header is encoded using a (63, 15) BCH encoder. However, in further embodiments, other BCH encoders could be employed, or more generally other algebraic FEC codes or other FEC codes.

As discussed above, after encoding, the bits are spread 113, interleaved 114, and scrambled 115 to condition them for transmission in a manner known in the art. A symbol mapper 116 then maps the bits onto symbols for transmission. The symbol mapper 116 may employ the same modulation scheme used in the subsystem 100, or may employ another type of modulation scheme. For example, the symbol mapping 116 may output symbols for various modulation schemes, such as BPSK, DBPSK, double DBPSK, $$\frac{\pi}{2}$$

DBPSK, FQPSK, and SOQPSK. After mapping 116, the symbols are pulse shaped 117, for example suing a predetermined matched filter, such as an SRRC filter. After pulse shaping 117, the bits are converted to analog at DAC 118 and passed to an analog subsystem for transmission. In some implementations, the DAC 118 may oversample the data to improve reception, for example at an 8× baud rate.

Figure 2:
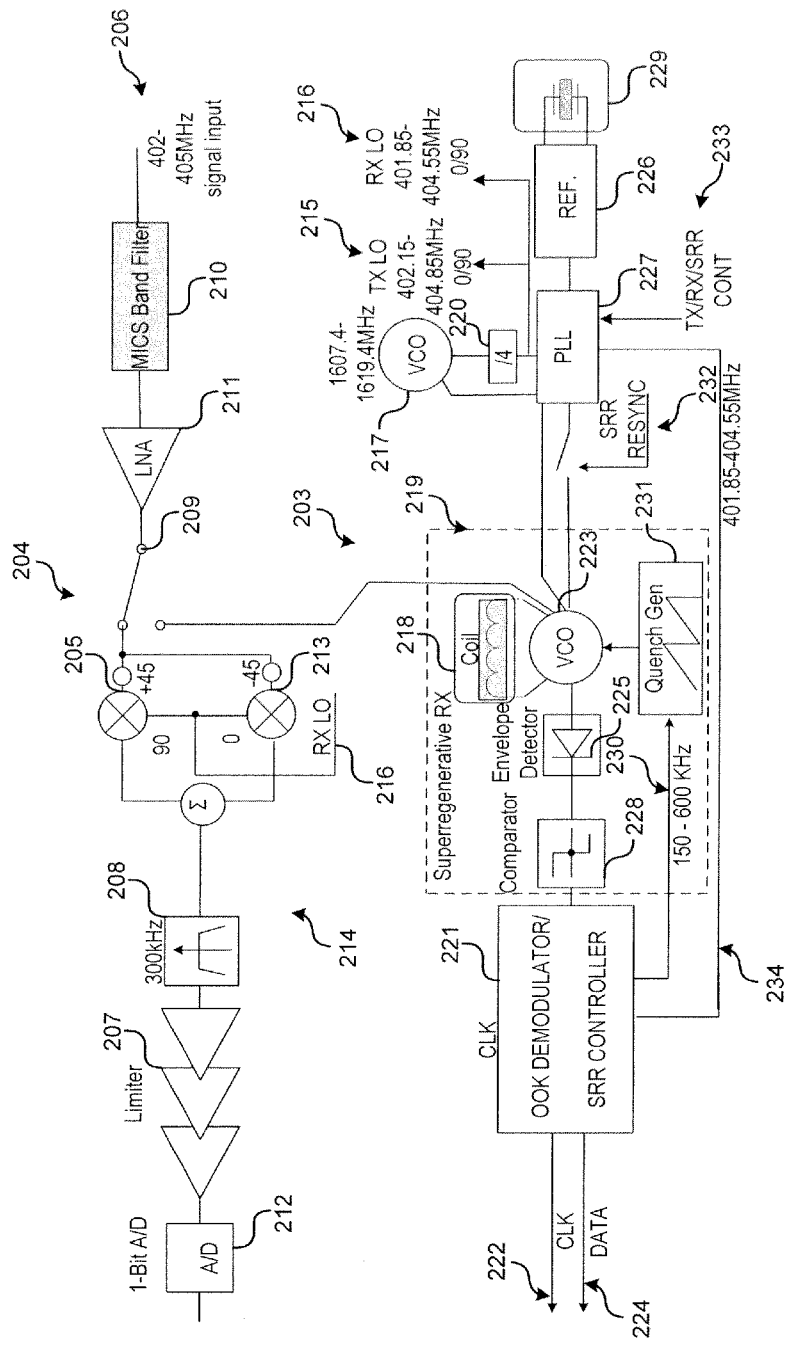
FIG. 2 illustrates a hybrid mixer and super-regenerative receiver implemented in accordance with an embodiment of the invention.

FIG. 2 illustrates a hybrid receiver that consists of LO IF receiver and super-regenerative receiver implemented in accordance with an embodiment of the invention. In some network environments, a relay point (such as a medical bracelet) is configured to establish a network link with a low-power device (such as a medical implant). According to certain restrictions, the medical implant may not be allowed to transmit channel selection information to the relay point. Rather, the relay point must select a communications channel from a band of channels and communicate the choice of channel to the medical device. In one embodiment, the relay point communicates the channel choice by broadcasting a wake up signal including the channel selection choice on the selected channel. The medical implant uses a wide-band detection method to monitor the entire band of channels, and thereby receives the wakeup signal. Subsequently, the low-power device is able to tune to the selected channel and for further communications. The wide-band reception uses less power than narrowband reception (which may require a sequential scan of the channels to receive the channel selection and wakeup information). The illustrated example shows an analog reception system with a wideband reception subsystem for receiving wake-up signals and a narrowband reception subsystem for further communications. In some further embodiments, beacon communications can also be performed using the wide-band reception mode, to further save power.

In the illustrated example, input signal 206 is passed through a band filter 210. For an application for MIC, the input signal will be between 402-405 MHz and the band filter 210 comprises a MICS band filter. The filtered signal passes through a low-noise amplifier (LNA) 211 to either a tunable narrow-band receiver 204 or the wideband receiver 203. A switch 209 controls this selection. Accordingly, in the illustrated embodiment, both receiver subsystems share the functionality of the antenna, band filter 210 and LNA 211.

In the search or beacon reception mode, the selection switch 209 that follows the LNA 211 connects to the super-regenerative receiver block 219. In the case of high data rate exchange or in the presence of a strong in-band interferer, the switch 209 selects higher power consumption low IF receiver 204. This adaptable architecture allows for optimal solution in terms of power savings and robustness, both of which are important for medical wireless application and other low-power applications.

The super-regenerative receiver 219 comprises an RF oscillator 223 and 218 that is periodically "quenched" by a lower frequency waveform (provided by quench generator 231). When the quench signal is applied to the oscillator 223 and 218, oscillations start to build up with an exponentially growing envelope. Applying an external signal at the oscillator's nominal frequency speeds the growth of the envelope of these oscillations (provided by VCO 223). In low-power simple logarithmic mode of operation is utilized in order to limit oscillation amplitude. Thus, the duty cycle of the oscillation changes in proportion to the amplitude of the applied RF signal (from LNA 211).

Super-regenerative detector 219 is well suited for OOK (on/off-keyed) signaling detection, which, in some embodiments, is used for wake-up, channel selection, or beaconing information. In other embodiment, the wakeup signal may comprise an un-modulated carrier burst. The super-regenerative detector 219 constitutes a sampled-data system; that is, each quench period samples and amplifies the RF signal (from LNA 211). To reconstruct the original modulation, in asynchronous mode of operation the quench generator 213 operates at a frequency a few times higher than the highest frequency in the original modulating signal. The super-regenerative receiver 219 exhibits high sensitivity and low selectivity. Although super-regenerative receivers tend to radiate RF energy through the antenna during oscillation period, this effect is prevented by LNA 211.

The super-regenerative receiver 219 comprises a voltage controlled oscillator (223). In the illustrated embodiment, the channel band comprises between 402 and 405 MHz, so a ~400 MHz VCO is used (in a particular embodiment, a 403.35 MHz VCO is employed). Typical on-chip inductance for a 400 MHz oscillator is large and low-Q. Accordingly, in this embodiment, an external inductor 218 is employed in conjunction with VCO 223.

A PLL frequency synthesizer 227 provides the external signal at the VCO's nominal frequency. In one embodiment, the PLL 227 is shared between the super-regenerative receiver 219 and mixer IF receiver 204, and an appropriate switchable N-registers divider is used to provide the subsystems with the appropriate frequency signals. The reference PLL clock is derived from a crystal 229 controller reference oscillator 226.

The receiver 219 further comprises a conventional envelope detector 225 and level comparator 228. A controller 221 provides a control frequency 234 for the PLL 227, a control frequency 230 fro the quench generator 231. In embodiments using modulated signals for wake-up, channel selection, or beaconing, the controller 221 may further provide demodulation of the received signals. In these embodiments, the controller 221 directly outputs a clock signal 222 and the demodulated data 224 for use by the MAC layer. The controller 221 may further provide clock restoration functionality and may provide a super-regenerative receiver resynchronization signal 232.

The narrow-band receiver subsystem 204 comprises a tunable low IF mixer receiver subsystem. Mixers and rotators 205 and 213 implement an image-reject mixer with the receiver reference signal 216. The signal 216 is output by PLL 227, using the VCO 217. In one embodiment, the VCO's 217 characteristics may be chosen according to the particular application. For example, in a particular embodiment, the VCO 217 comprises a 1.6 GHz VCO and the reference signal 216 is generated using a divider 220.

The receiver subsystem 204 further comprises a bandpass filter 208 configured to pass a frequency band at a low intermediate frequency (IF). The receiver subsystem 204 further comprises a conventional limiting amplifier 207 coupled to the filter 208. In the illustrated embodiment, digital conversion is implemented using a single bit ADC 212 or "slicer." The operation of the single bit ADC is discussed in further detail below.

In further embodiments, the low-power device comprises a transceiver, and some of the illustrated components are used for transmission as well. For example, the reference clock 226 (with crystal 229), PLL 227, VCO 217, and divider 220 (if used) may be used to output a local oscillator frequency signal 215 for the transmitter.

In some embodiments, if the controller 221 detects sufficient interference on the channel band, such that reception of the wakeup signal, beaconing information, or channel selection information, the MAC layer utilize the receiver subsystem 204 for any or all of these functions. For example, the receiver subsystem 204 may be used to sequentially scan the available channels of the frequency band for incoming channel selection or beaconing information.

Figure 3:
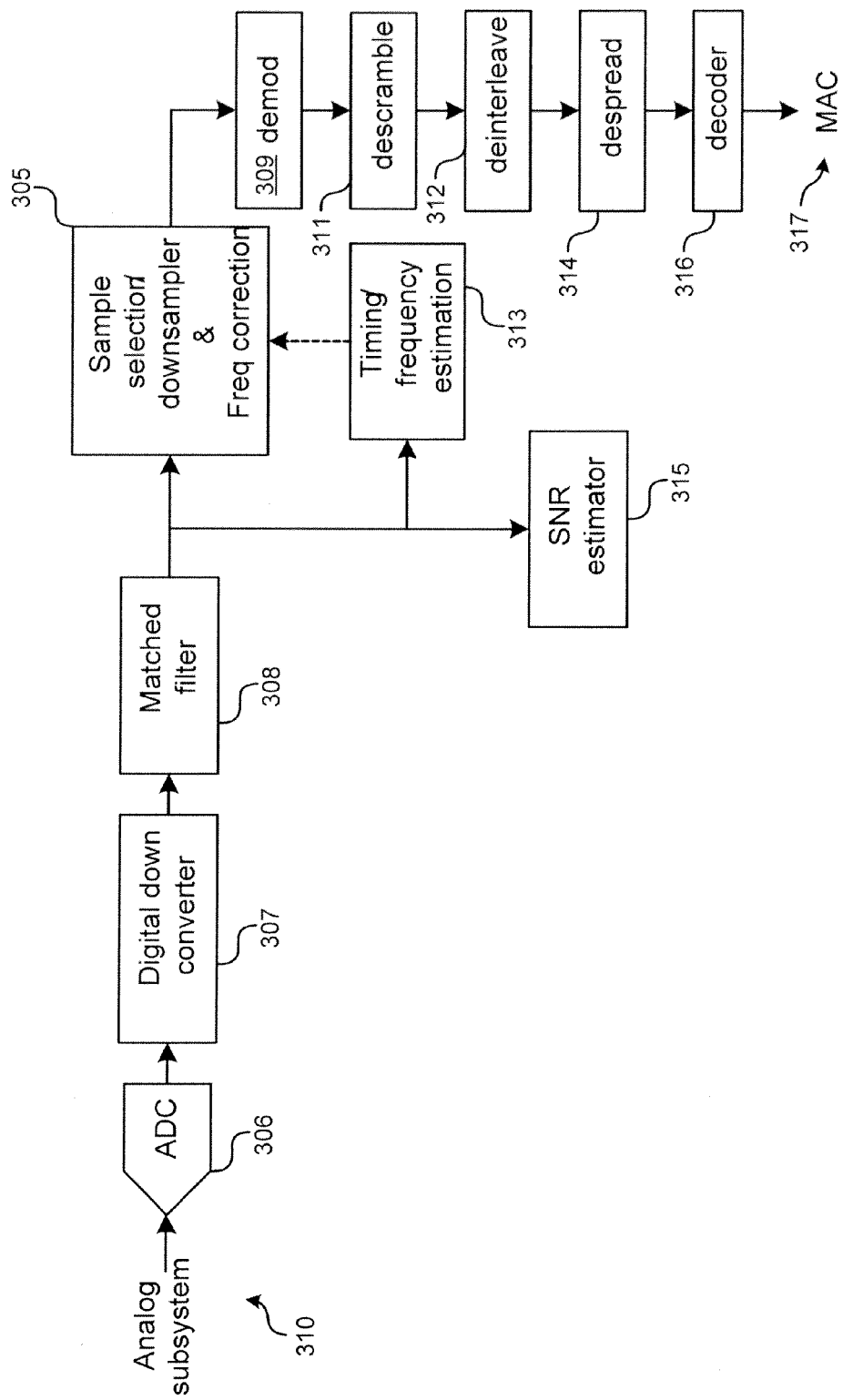
FIG. 3 illustrates an exemplary digital receiver subsystem block diagram implemented in accordance with an embodiment of the invention.

FIG. 3 illustrates an exemplary digital receiver subsystem block diagram implemented in accordance with an embodiment of the invention. In the illustrated embodiment, an analog signal is received from the analog subsystem 310. For example, the analog subsystem 310 may implemented as the subsystem in FIG. 2, with the signal received from the low IF mixing subsystem 204. The signal is converted to digital using ADC 306, which in some embodiments may comprise a single bit ADC. The signal is then digitally down converted from IF to baseband at digital down converter 307. Down converter 307 may implemented as described below, or in any other conventional manner. The IF may be equal to approximately the half channel spacing, and can avoid DC-offset and flicker noise issues that may otherwise result from direct conversion in the analog subsystem 310.

In environments where a pulse shaping filter is employed at the transmitter, a matched filter 308 is used to filter undesirable components and any additional signals that may arise from out of band noise or interference from other communications channels. The filtered signal is provided to a signal-to-noise ratio (SNR) estimator 315 for use in rate selection or other conventional link adaptations or adjustments of receiver variables. The filtered signal is further provided to a timing and frequency estimation module 313 for use in sample selecting, down sampling, and frequency correction in module 305. After the signal has been downsampled, and frequency correction, the signal is demodulated at module 309, descrambled at module 311, deinterleaved at module 312, despread at module 314, and finally decoded at module 316. These modules may all be implemented as discussed below or in a conventional manner known to one of ordinary skill in the art. The decoded data is then provided to the MAC layer 317 for further processing and use.

Figure 4:
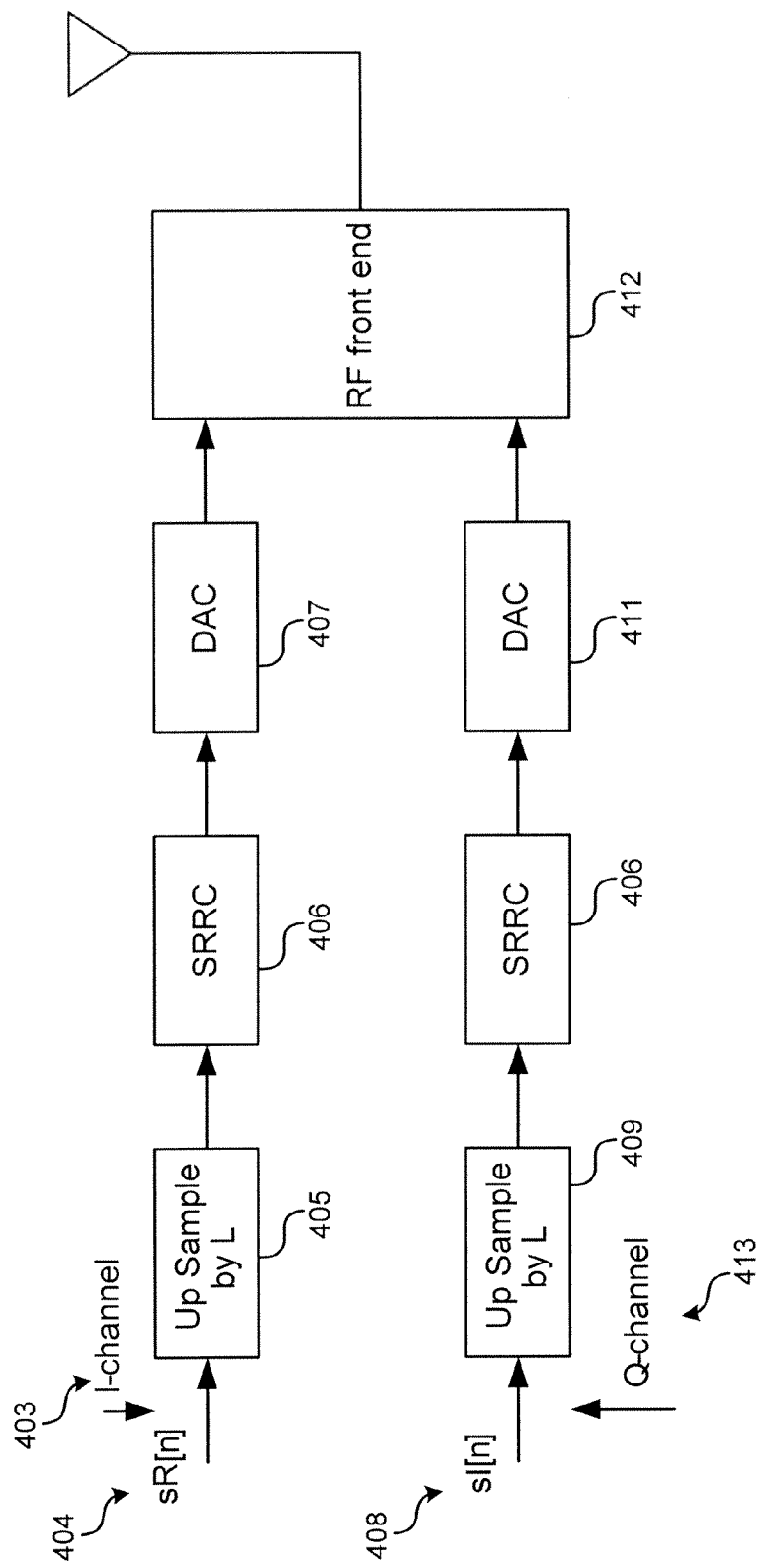
FIG. 4 illustrates a block diagram of a transmitter architecture for generation of a signal for a network environment for which particular embodiments are configured.

FIG. 4 illustrates a block diagram of a transmitter architecture for generation of a signal for a network environment for which particular embodiments are configured. The RF signal in this system is $$x_{RF}(t) = \sum_n S_R[n] p_T(t-nT_b)\cos(2\pi f_c t) - s_I[n] p_T(t-nT_b)\sin(2\pi f_c t)$$

where $s[n]=S_R[n]+jS_I[n]$ is the baseband data symbols 404 and 408 on the in-phase 403 and quadrature channels 413, respectively, $p_T(t)$ is the pulse shaping filter 406 (which is applied to both channels separately), $T_b$ is the symbol/baud interval (which is produced by oversampling at modules 405 and 409), and $f_c$ is the carrier frequency (which the signal is modulated to on at RF frontend 412). For a BAN transceiver operating in the MICS band, the center frequency $f_c$ is in the range of 402-405 MHz. The bandwidth of each channel in MICS band is 300 KHz, which means $$T_b > \frac{1}{300K}$$

sec. According to the BAN PHY specification, the pulse shaping filter $p_T(t)$ is a square-root raised cosine (SRRC) filter (or RRC). These parameters may all be modified as applicable for different network environments.

In the illustrated transmitter, the baseband signal s[n] 404 and 408, are oversampled 405 and 409 by a factor of L and sent over the I and Q channels 405 and 409 separately. The SRRC 406 is used to shape the spectrum of transmitter signal. After SRRC filtering, the digital signal is then converted to analog signal via DACs 407 and 411. The resolution of DAC has an impact to the shape of transmit spectrum and the overall performance. In an alternative implementation, a single DAC may be employed by modulating the baseband signal to a low-IF signal before DAC.

Figure 5:
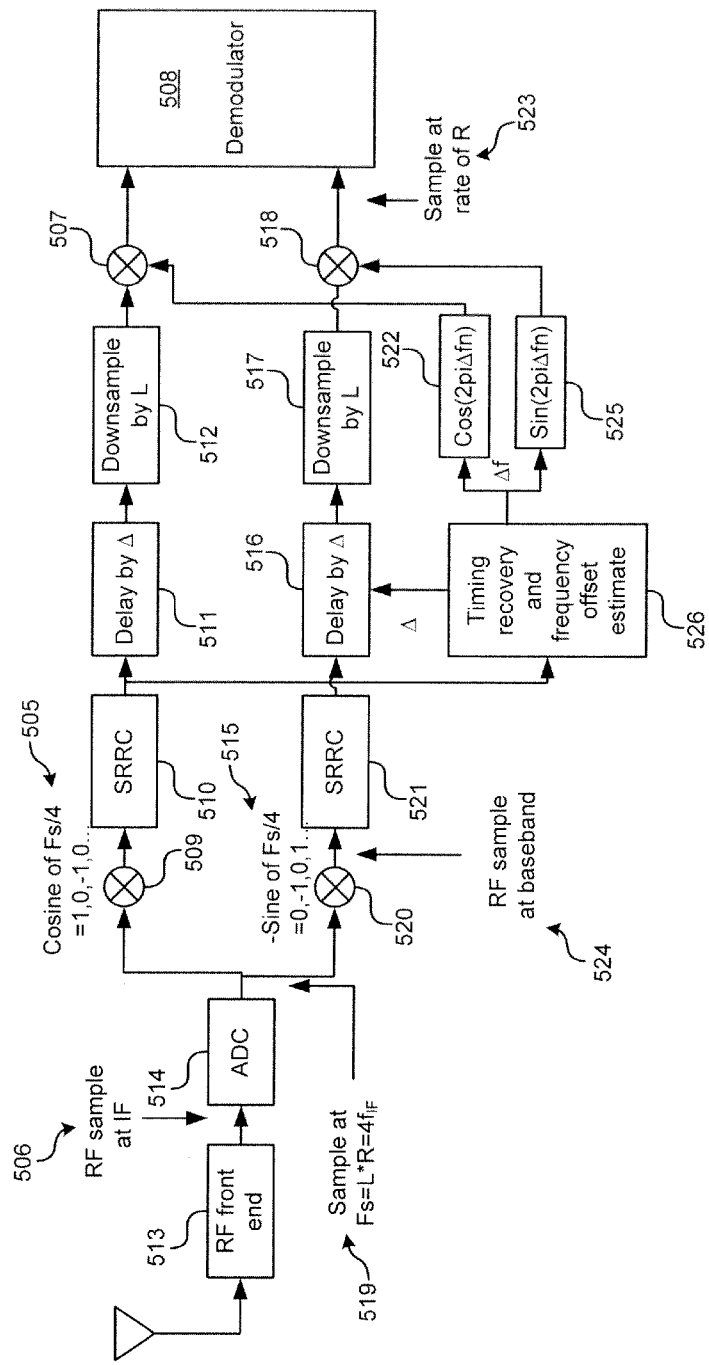
FIG. 5 illustrates a digital receiver subsystem implemented in accordance with an embodiment of the invention.

FIG. 5 illustrates a digital receiver subsystem implemented in accordance with an embodiment of the invention. The illustrated embodiment is described in conjunction with the signal described with respect to FIG. 4. Various modifications may be made to the modules and receiver parameters for other implementations. The digital receiver subsystem receives a signal from an RF front end 513. In some embodiments, the RF front end 513 may comprise an analog receiver subsystem such as the one described with respect to FIG. 2, in particular subsystem 204. In other embodiments, the RF front end 513 may comprise a conventional analog receiver.

The RF sample 506 provided by the RF front end 513 is at a low-IF. In the illustrated embodiment, the low-IF signal is described as:

$$Y_{IF}(t) = \sum_n S_R[n] p_T(t-nT_b)\cos(2\pi f_{IF} t) - s_I[n] p_T(t-nT_b)\sin(2\pi f_{IF} t) + w(t)$$

where $f_{IF}$ is the low IF frequency. An ADC 514 samples the data to provide a sampled signal. In one embodiment, the rate of the samples taken by ADC is assumed to be L times faster than the symbol rate R, where L is the oversampling rate used in the transmission as described above. In the particular illustrated embodiment the IF ($f_{IF}$) is selected such that $L*R=4f_{IF}$.

The in-band and quadrature components of the signal are converted to baseband using mixers 509 and 520. Mixer 509 multiplies the signal $y_{IF}[n]$ by $$\cos\left(2\pi f_{IF}\frac{T_b}{L}n\right).$$

Mixer 520 multipliers the signal by $$-\sin\left(2\pi f_{IF}\frac{T_b}{L}n\right).$$

In some embodiments, computation of the mixers 509 and 520 is reduced by selecting $f_{IF}$ such that $$\cos\left(2\pi f_{IF}\frac{T_b}{L}n\right)$$

and $$-\sin\left(2\pi f_{IF}\frac{T_b}{L}n\right)$$

take the values from the sequences $\{+1,0,-1,0,+1,\ldots\}$ and $\{-1,0,+1,0,-1,\ldots\}$, respectively. In a particular embodiment, $f_{IF}$ is chosen to be equal to $$\frac{1}{4}\frac{L}{T_b}\left(=\frac{1}{4}f_s\right),$$

where $$f_s = \frac{L}{T_b} = LR_b$$

is the sampling frequency of ADC. In this embodiment, $$2\pi f_{IF}\frac{T_b}{L}n = 2\pi \frac{1}{4}\frac{L}{T_b}\frac{T_b}{L}n = \frac{\pi}{2}n,$$

and, thus, $$\cos\left(2\pi f_{IF}\frac{T_b}{L}n\right)$$

and $$-\sin\left(2\pi f_{IF}\frac{T_b}{L}n\right)$$

take the trivial values of +1,0,−1,0,+1,0, . . . and −1,0,+1, 0,−1, . . . , respectively.

After multiplication of $Y_{IF}[n]$ by $$\cos\left(2\pi f_{IF}\frac{T_b}{L}n\right)$$

and $$-\sin\left(2\pi f_{IF}\frac{T_b}{L}n\right),$$

the resulting signals 524 contain the desired baseband signal as well as its undesirable spectral components around $2f_{IF}$. These undesirable components and any additional signals that may arise from out of band noise or interference from other communication channels are filtered by the lowpass filters SRRC 510 and 520, $p_T(t)$, which are chosen to be matched to the pulse shaping filter(s) at the transmitter side.

In the illustrated embodiment, the signals include preambles configured to enable timing recover and frequency offset estimation. In some embodiments, only the signal on one channel, such as the in-phase channel is needed for these functions. This signal is provided to module 526 to recover a timing recovery value Δ and a frequency offset estimate Δf. The signals output by filters 520 and 521 are then delayed by Δ at modules 511, and 512 respectively. After timing recovery, the signals are down sampled by L at down-samplers 512 and 517, respectively. Frequency offset compensation is then performed using mixers 507 and 518, respectively. In the in-phase components are multiplied 507 by cos(2πΔfn) (522) and the quadrature components are multiplied 518 by sin (2πΔfn) (525) using the value of Δf retrieved by module 526.

After this process, the signal 523 is a series of samples at the sample rate R 523 with in-phase and quadrature components. This signal is provided to the demodulator 508 for demodulation, and subsequently to modules for descrambling, deinterleaving, despreading, and decoding.

In some embodiments, the ADC 514 may comprise a single-bit ADC. The single-bit ADC samples the signal and retains only the sign of the signal. The amplitude of the signal is completely ignored. Although this reduces receiver sensitivity, this sampling scheme greatly reduces current consumption by eliminating the need for a variable gain amplifier (VGA) or automatic gain control (AGC) modules across the analog and digital domains. The single-bit ADC further relaxes constraints on the linearity of the amplifier. Although a single bit ADC will introduce increased quantization errors than a multi-bit ADC, this can somewhat be countered by oversampling. Although a single-bit ADC eliminates all the information conveyed by the amplitude of the signal, it is suitable for applications using phase modulation schemes such as pi/2 DBPSK, BPSK, Double DBPSK, and higher order constant envelope (or near constant envelope) versions of offset QPSK, such as FQPSK and MIL-STD SOQPSK. When operated through a non-linear (hard limited) channel, the BER performance of these higher-order waveforms is not significantly affected in comparison to linear channels.

In packet based communications systems, such as the system described with respect to FIGS. 4 and 5, acquisition involves packet detection as one of the first functions to be executed at the physical layer, since the receiver does not know a priori whether a packet is present, and where it exactly starts. Once a packet is detected, subsequent processing for time and frequency synchronization and demodulation can be done, including frequency offset correction for the payload portion (beyond preamble).

Hence, the remaining synchronization process is dependent on good packet detection performance. Generally, a sequence of known signals or symbols (usually called a preamble) is transmitted at the beginning of a packet, and must be identified by the receiver in order to detect a packet.

Figure 6:
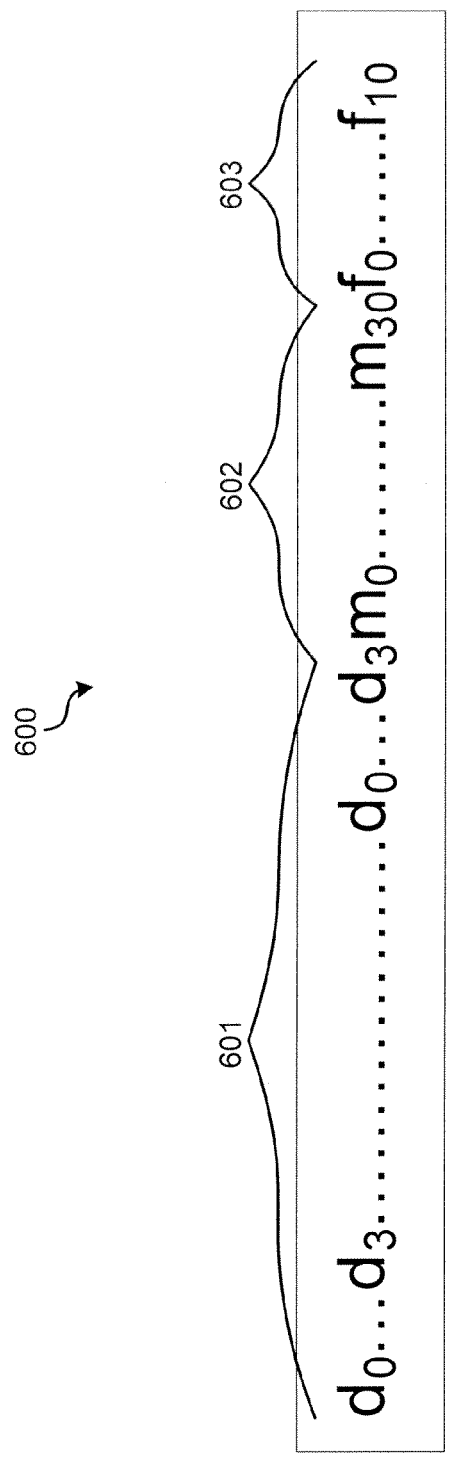
FIG. 6 illustrates an embodiment of a preamble structure for transmission with packets in the system described with respect to FIG. 5.

FIG. 6 illustrates an embodiment of a preamble structure for transmission with packets in the system described with respect to FIG. 5. The preamble 600 is transmitted before the header and data portions of a packet. In one embodiment, the preamble bits are modulated using π/2-DBPSK modulation and are transmitted at the symbol rate. The preamble 600 is divided into three portions dedicated respectively to delay correlation 601, timing acquisition 602 (match filtering once a packet is asserted to be present after delay correlation), and frequency offset estimation 603.

The delay correlation portion 601 comprises a preamble having a repeating structure where groups of symbol values are repeated. The symbols of the preamble may comprises single bit symbols. In some embodiments, a delay correlation portion 601 may be less than or equal to 64 bits long, but still have a strong probability of detection and low probability of false alarm detection. In the illustrated embodiment, the first portion 601 comprises 12 groups with 4 bits in each group that are repeated. This preamble structure allows flexibility in delay correlation design. For example, delay correlation may be performed using each group of 4 bits, or delay correlation may be used on multiple group repeats, such as 2 group repeats of 8 bits, or even 6 group repeats of 24 bits.

In the system of FIG. 5, packet acquisition and frequency offset are performed by module 526 using portion 601. Correlation with a known sequence 602, such as pseudorandom binary sequence, for example, an m-sequence is used for to provide symbol timing, and optionally, further correlation for finer timing. In the illustrated embodiment, portion 602 comprises a predetermined 30-bit m-sequence. The third portion 603 comprises a sequence of alternating bits for frequency offset estimation. In the illustrated embodiment, the portion 603 is 11 bits long, for a total preamble length of 90 bits, significantly shorter than conventional systems.

Figure 7:
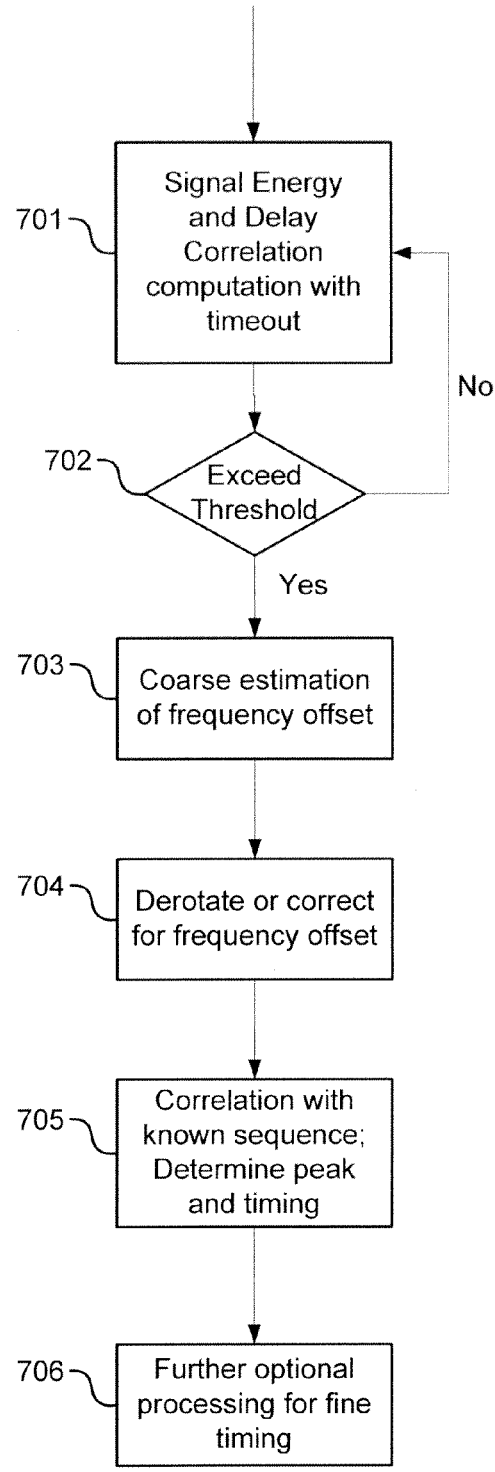
FIG. 7 illustrates a process for packet detection timing recovery and frequency offset estimation performed by a timing recovery module.

FIG. 7 illustrates a process for packet detection timing recovery and frequency offset estimation performed by the timing recovery module 526. In step 701 the signal energy is computed and delay correlation is performed on the preamble portion 601. If the output of this process exceeds a threshold 702, a packet is detected and further processing occurs. A coarse frequency offset estimation is performed in step 703 using the preamble 600. The preamble is then derotated (corrected for the coarse frequency offset) in step 704. The coarse-frequency corrected preamble portion 602 is correlated with a known sequence 705 to determine a peak and timing value. In some embodiments, further optional processing 706 may take place for fine timing correction, in a typical manner known in the art.

Figure 8:
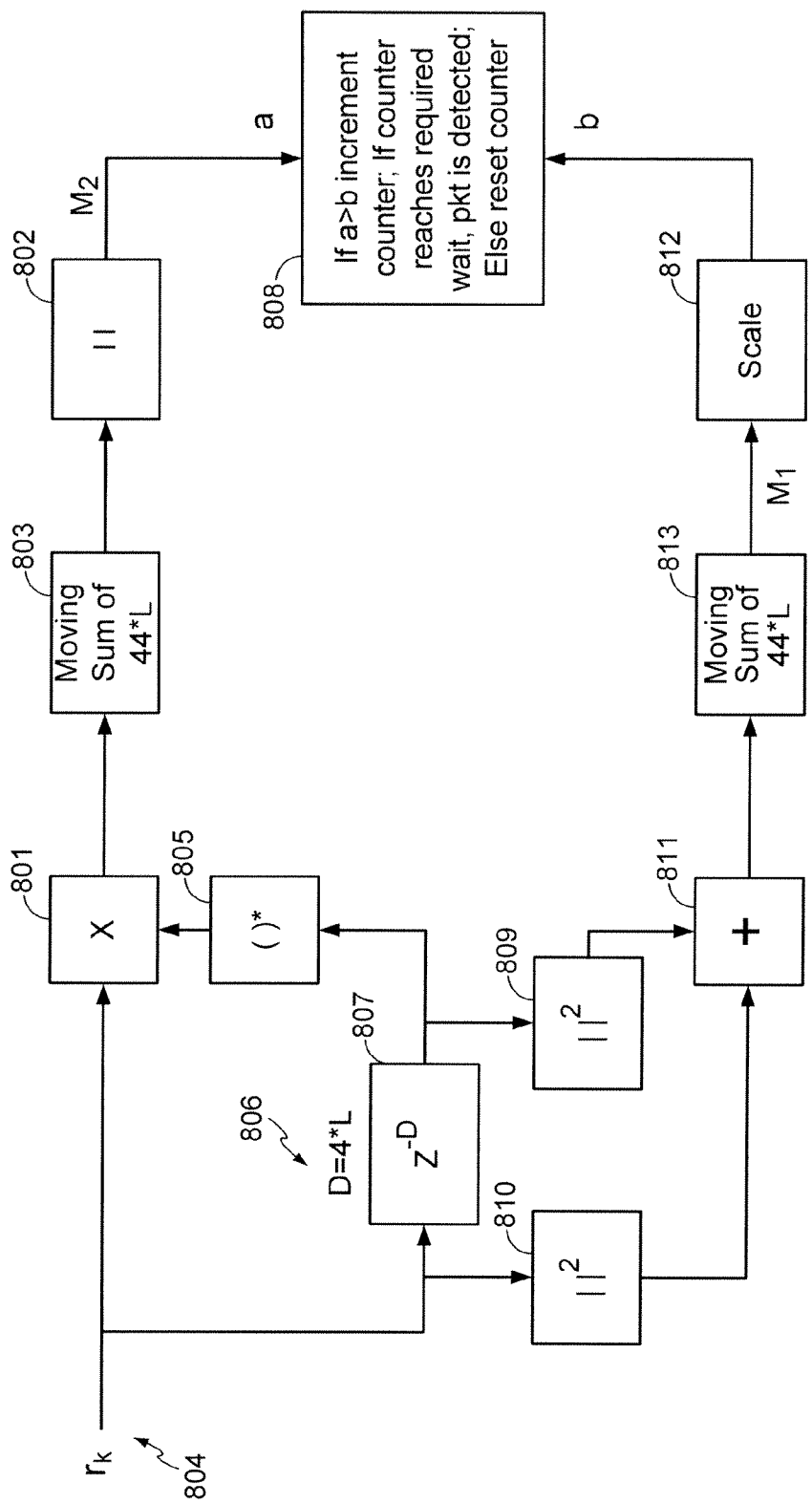
FIG. 8 depicts the signal processing performed at the receiver in FIG. 5 during delay correlation.

Delay correlation can be used to detect the presence of a packet when a portion of the preamble of the packet is repeated. In the illustrated system, packet detection is based on correlation of the received signal 601 with a delayed version of itself. In this embodiment, even when the number of samples over which delay correlation is performed is relatively small, the all essentially desirable features of the (coarse) timing and frequency offset estimation statistics are preserved even for accumulation lengths down to 1. Reducing the accumulation length has little effect even on some theoretical approximations of the detection threshold (although alternative threshold settings are preferred in implementation). FIG. 8 depicts the signal processing performed at the receiver in FIG. 5 during delay correlation.

The upper path in the block diagram computes delay correlation metric $M_2$ whereas the lower path computes the energy of the signal $M_1$. The signal 804 comprises the preamble 601. The signal is delayed at a running sum, taking account of the oversampling rate L 806, in module 807. In the upper path, the signal is multiplied with conjugate 805 of the delayed version in mixer 801. A moving sum of these values 803 is accumulated for the length of the preamble. In the illustrated particular preamble 601, there are 11 groups of 4 symbols, so the sum is over 44*L samples. The magnitude of this amount 802 is used as the delay correlation metric $M_2$=a.

In the lower path, the energy of the samples 810 is added 811 with the energy of the delayed samples 809. These results are also summed over the length of the preamble 813 to generate an energy metric $M_1$. This metric is scaled 812 to produce a value b for comparison to the delay metric a. In packet detection module 808, if a>b then a counter is incremented. If the counter reaches a predetermined required wait value, a packet is detected. Otherwise, the counter is reset for future packet detection. In some embodiments employing a single bit ADC, a constant threshold value may be used rather than the energy threshold b.

Following delay correlation, a coarse estimate of time and frequency given a detected packet is available. A finer estimation of time synchronization can be obtained by first frequency correcting subsequent preamble portion 602 and performing a correlation with a reference m-sequence stored at the receiver. In the illustrated embodiment, the reference sequence is of length 31 and is the π/2-DBPSK modulated up-sampled, and SRRC filtered equivalent for the bit pattern m0 . . . m30 602 that is part of the preamble after delay correlation sequence. In this embodiment, the correlation metric $M_3$ is given by, $$M_3 \max_{j} \left| \sum_{k=1}^{31L} t_k r^*_{k+j} \right|$$

where $t_k$ is one of the 31 L=248 samples (upsampled length-31 sequence is 31 L sample long) in the long reference sequence. The maximum point gives the estimate of the time offset. In some embodiments, the maximum can is also compared with a threshold to further prevent any false alarm.

Returning to FIG. 3, after the demodulated symbols are descrambled and deinterleaved, they are despread in module 314. In some embodiments, soft information in the signal may be combined by despreader module 314. In particular, this may be applied when the communications modulation system utilizes a system where the information exists only along one dimension, for example the in-quadrature component. For example, this is a property of occurs in $$\frac{\pi}{2} - DBPSK.$$

As a result, it is possible straightforwardly combine the soft-information prior to de-spreading, and only afterward perform hard-demodulation; the hard-demodulated coded bits can be fed to a hard decoder 316. Using a matched filter 308, such as an SRRC filter, this soft information exists even when a single-bit ADC is used as ADC 306. In alternative embodiments, the soft information can be used to perform soft-decoding in decoder 316.

Figure 9:
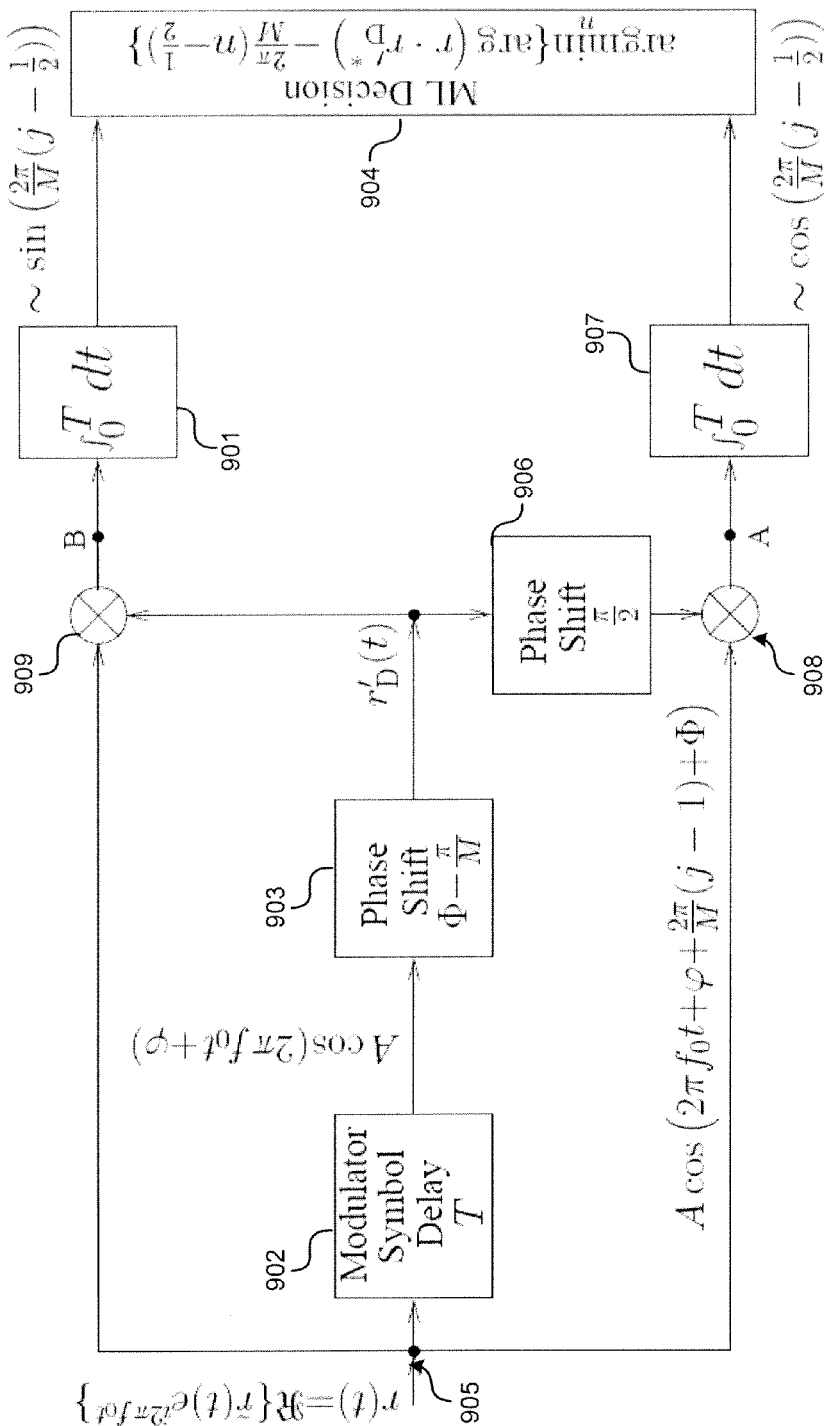
FIG. 9 illustrates an example configuration of a demodulator for a differentially-coherent encoded M-PSK signal.

An example configuration of a demodulator 508 for differentially-coherent encoded M-PSK is illustrated in FIG. 9. In this figure, for ease of illustration, only signal components are shown (i.e. the figure illustrates the noise-free equivalent). In the differentially coherent coded M-PSK scheme, information is encoded into phase shifts, which take values in the set $$\left\{ \frac{2\pi}{M}(j-1) + \Phi \right\}_{j=1}^{M}$$

where Φ denotes the phase misalignment due to non-coherence. As discussed above, the process may be employed using one dimension of the signal, r(t). In the illustrated embodiment, the signal 905 is $r(t)=\Re\{\tilde{r}(t)e^{j2\pi f_0 t}\}$. The signal 905 is delayed 902 using the determined symbol delay to determine A cos(2πf$_0$t+φ). This is then phase shifted 903 by an amount $$\Phi - \frac{\pi}{2}$$

to derive the signal $r_D'(t)$. In the upper path r(t) is multiplied 909 with $r_D'(t)$ and integrated 901 over the set of spread symbols to derive the combined soft despreading information for one of the signal components. In the lower path, $r_D'(t)$ is phase shifted 906 by $$\frac{\pi}{2}$$

before multiplication 908 with r(t) and integration 907 to derive the combined soft despreading information for the other component. The demodulator then can use the soft-despreading information in hard decoding maximum likelihood (ML) decision module 904 as illustrated to hard-demodulate the signal. In alternative embodiments, the hard demodulator block 904 may instead comprise a soft-decoder.

Figure 10:
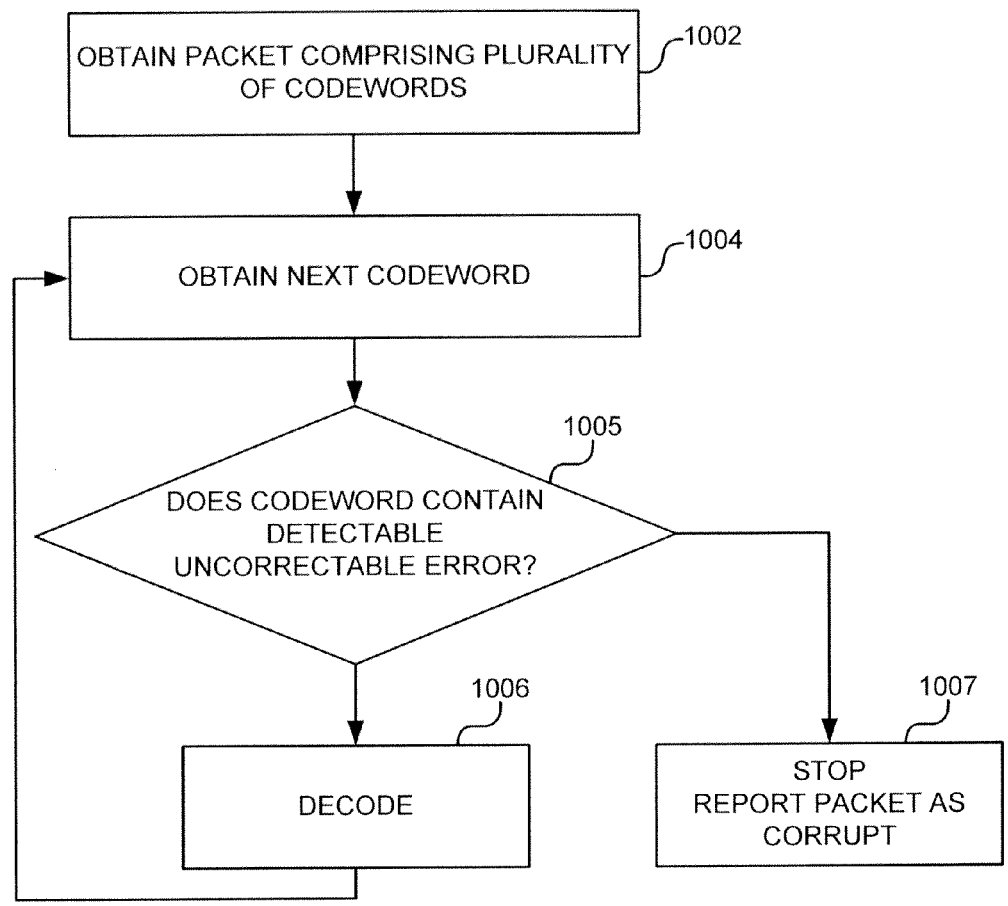
FIG. 10 illustrates for reducing the frequency of corrupted packets and power saving at the decoder implemented in accordance with an embodiment of the invention.

Some embodiments of the invention operate in communications environments employ block FEC codewords, such as algebraic FEC codewords. In particular, certain embodiments operate on BCH codes. In such environments, a packet comprises a plurality of codewords. In some cases, these codewords will have uncorrectable errors, resulting in corrupted packets. In some embodiments, the decoder detects if a codeword has a detectable but uncorrectable error, and if so, stops decoding the remainder of the packet. This process can potentially significantly reduces baseband power consumption (60% asymptotically) associated with the decoder operation. FIG. 10 illustrates such a method.

In step 1002, the receiver obtains a packet comprising a plurality of codewords. In step 1004, the decoder obtains a first codeword of the packet, or in a repetition of the method, the next codeword of the packet. During the decoding process, the decoder evaluates 1005 the codeword to determine if the codeword contains a detectable but uncorrectable error. All of the detectable uncorrectable errors can be found, in one embodiment, by monitoring whether the Chien searcher finds fewer roots than the degree of the error locator polynomial. If the syndrome $S_1=0$ then the coefficients of the error locator polynomial cannot be solved for, and decoding can be safely stopped and the packet is reported as corrupt 1007. There is no additional information in re-calculating syndromes post-error correction, and doing so only expends power. If as many roots as the degree of the error locator polynomial turn out in the error locator field, then either correct or incorrect decoding 1006 has occurred (and the latter is undetectable). This process further improves the reliability of the system because there is a possibility that a residual error would be undetectable at the MAC layer, in which case the MAC layer would forward the corrupted payload to the application layer. Reducing the probability of a residual error in a packet provided to the MAC layer reduces the number of corrupted payloads provided to the application layer. Additionally, reducing the number of corrupted packets provided to the MAC layer improves the packet error rate seen by the MAC layer.

Figure 11:
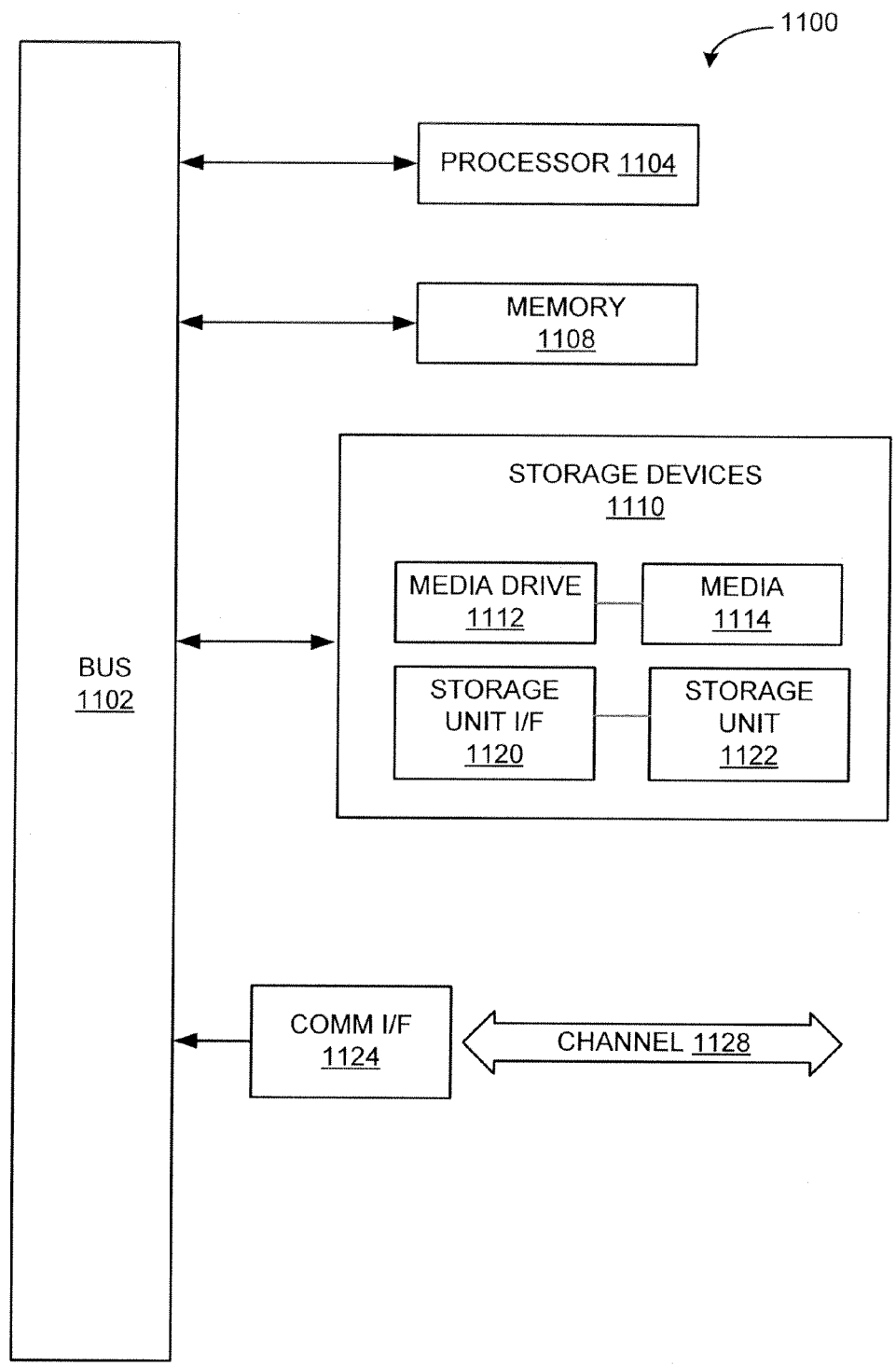
FIG. 11 illustrates an example computing module that may be used in implementing various features of embodiments of the invention.

As used herein, the term module might describe a given unit of functionality that can be performed in accordance with one or more embodiments of the present invention. As used herein, a module might be implemented utilizing any form of hardware, software, or a combination thereof. For example, one or more processors, controllers, ASICs, PLAs, PALs, CPLDs, FPGAs, logical components, software routines or other mechanisms might be implemented to make up a module. In implementation, the various modules described herein might be implemented as discrete modules or the functions and features described can be shared in part or in total among one or more modules. In other words, as would be apparent to one of ordinary skill in the art after reading this description, the various features and functionality described herein may be implemented in any given application and can be implemented in one or more separate or shared modules in various combinations and permutations. Even though various features or elements of functionality may be individually described or claimed as separate modules, one of ordinary skill in the art will understand that these features and functionality can be shared among one or more common software and hardware elements, and such description shall not require or imply that separate hardware or software components are used to implement such features or functionality.

Where components or modules of the invention are implemented in whole or in part using software, in one embodiment, these software elements can be implemented to operate with a computing or processing module capable of carrying out the functionality described with respect thereto. One such example computing module is shown in FIG. 11. Various embodiments are described in terms of this example-computing module 1100. After reading this description, it will become apparent to a person skilled in the relevant art how to implement the invention using other computing modules or architectures.

Referring now to FIG. 11, computing module 1100 may represent, for example, computing or processing capabilities found within desktop, laptop and notebook computers; handheld computing devices (PDA's, smart phones, cell phones, palmtops, etc.); mainframes, supercomputers, workstations or servers; or any other type of special-purpose or general-purpose computing devices as may be desirable or appropriate for a given application or environment. Computing module 1100 might also represent computing capabilities embedded within or otherwise available to a given device. For example, a computing module might be found in other electronic devices such as, for example, digital cameras, navigation systems, cellular telephones, portable computing devices, modems, routers, WAPs, terminals and other electronic devices that might include some form of processing capability.

Computing module 1100 might include, for example, one or more processors, controllers, control modules, or other processing devices, such as a processor 1104. Processor 1104 might be implemented using a general-purpose or special-purpose processing engine such as, for example, a microprocessor, controller, or other control logic. In the illustrated example, processor 1104 is connected to a bus 1102, although any communication medium can be used to facilitate interaction with other components of computing module 1100 or to communicate externally.

Computing module 1100 might also include one or more memory modules, simply referred to herein as main memory 1108. For example, preferably random access memory (RAM) or other dynamic memory, might be used for storing information and instructions to be executed by processor 1104. Main memory 1108 might also be used for storing temporary variables or other intermediate information during execution of instructions to be executed by processor 1104. Computing module 1100 might likewise include a read only memory ("ROM") or other static storage device coupled to bus 1102 for storing static information and instructions for processor 1104.

The computing module 1100 might also include one or more various forms of information storage mechanism 1110, which might include, for example, a media drive 1112 and a storage unit interface 1120. The media drive 1112 might include a drive or other mechanism to support fixed or removable storage media 1114. For example, a hard disk drive, a floppy disk drive, a magnetic tape drive, an optical disk drive, a CD or DVD drive (R or RW), or other removable or fixed media drive might be provided. Accordingly, storage media 1114 might include, for example, a hard disk, a floppy disk, magnetic tape, cartridge, optical disk, a CD or DVD, or other fixed or removable medium that is read by, written to or accessed by media drive 1112. As these examples illustrate, the storage media 1114 can include a computer usable storage medium having stored therein computer software or data.

In alternative embodiments, information storage mechanism 1110 might include other similar instrumentalities for allowing computer programs or other instructions or data to be loaded into computing module 1100. Such instrumentalities might include, for example, a fixed or removable storage unit 1122 and an interface 1120. Examples of such storage units 1122 and interfaces 1120 can include a program cartridge and cartridge interface, a removable memory (for example, a flash memory or other removable memory module) and memory slot, a PCMCIA slot and card, and other fixed or removable storage units 1122 and interfaces 1120 that allow software and data to be transferred from the storage unit 1122 to computing module 1100.

Computing module 1100 might also include a communications interface 1124. Communications interface 1124 might be used to allow software and data to be transferred between computing module 1100 and external devices. Examples of communications interface 1124 might include a modem or softmodem, a network interface (such as an Ethernet, network interface card, WiMedia, IEEE 802.XX or other interface), a communications port (such as for example, a USB port, IR port, RS232 port Bluetooth® interface, or other port), or other communications interface. Software and data transferred via communications interface 1124 might typically be carried on signals, which can be electronic, electromagnetic (which includes optical) or other signals capable of being exchanged by a given communications interface 1124. These signals might be provided to communications interface 1124 via a channel 1128. This channel 1128 might carry signals and might be implemented using a wired or wireless communication medium. Some examples of a channel might include a phone line, a cellular link, an RF link, an optical link, a network interface, a local or wide area network, and other wired or wireless communications channels.

In this document, the terms "computer program medium" and "computer usable medium" are used to generally refer to media such as, for example, memory 1108, storage unit 1120, media 1114, and channel 1128. These and other various forms of computer program media or computer usable media may be involved in carrying one or more sequences of one or more instructions to a processing device for execution. Such instructions embodied on the medium, are generally referred to as "computer program code" or a "computer program product" (which may be grouped in the form of computer programs or other groupings). When executed, such instructions might enable the computing module 1100 to perform features or functions of the present invention as discussed herein.

While various embodiments of the present invention have been described above, it should be understood that they have been presented by way of example only, and not of limitation. Likewise, the various diagrams may depict an example architectural or other configuration for the invention, which is done to aid in understanding the features and functionality that can be included in the invention. The invention is not restricted to the illustrated example architectures or configurations, but the desired features can be implemented using a variety of alternative architectures and configurations. Indeed, it will be apparent to one of skill in the art how alternative functional, logical or physical partitioning and configurations can be implemented to implement the desired features of the present invention. Also, a multitude of different constituent module names other than those depicted herein can be applied to the various partitions. Additionally, with regard to flow diagrams, operational descriptions and method claims, the order in which the steps are presented herein shall not mandate that various embodiments be implemented to perform the recited functionality in the same order unless the context dictates otherwise.

Although the invention is described above in terms of various exemplary embodiments and implementations, it should be understood that the various features, aspects and functionality described in one or more of the individual embodiments are not limited in their applicability to the particular embodiment with which they are described, but instead can be applied, alone or in various combinations, to one or more of the other embodiments of the invention, whether or not such embodiments are described and whether or not such features are presented as being a part of a described embodiment. Thus, the breadth and scope of the present invention should not be limited by any of the above-described exemplary embodiments.

Terms and phrases used in this document, and variations thereof, unless otherwise expressly stated, should be construed as open ended as opposed to limiting. As examples of the foregoing: the term "including" should be read as meaning "including, without limitation" or the like; the term "example" is used to provide exemplary instances of the item in discussion, not an exhaustive or limiting list thereof; the terms "a" or "an" should be read as meaning "at least one," "one or more" or the like; and adjectives such as "conventional," "traditional," "normal," "standard," "known" and terms of similar meaning should not be construed as limiting the item described to a given time period or to an item available as of a given time, but instead should be read to encompass conventional, traditional, normal, or standard technologies that may be available or known now or at any time in the future. Likewise, where this document refers to technologies that would be apparent or known to one of ordinary skill in the art, such technologies encompass those apparent or known to the skilled artisan now or at any time in the future.

The presence of broadening words and phrases such as "one or more," "at least," "but not limited to" or other like phrases in some instances shall not be read to mean that the narrower case is intended or required in instances where such broadening phrases may be absent. The use of the term "module" does not imply that the components or functionality described or claimed as part of the module are all configured in a common package. Indeed, any or all of the various components of a module, whether control logic or other components, can be combined in a single package or separately maintained and can further be distributed in multiple groupings or packages or across multiple locations.

Additionally, the various embodiments set forth herein are described in terms of exemplary block diagrams, flow charts and other illustrations. As will become apparent to one of ordinary skill in the art after reading this document, the illustrated embodiments and their various alternatives can be implemented without confinement to the illustrated examples. For example, block diagrams and their accompanying description should not be construed as mandating a particular architecture or configuration.

The invention claimed is:

1. A receiver, comprising:
   a signal input;
   a first receiver subsystem coupled to the signal input and configured to receive signals transmitted on a first frequency band centered on a first frequency and comprising a plurality of channels;
   a second receiver subsystem coupled to the signal input and configured to receive signals transmitted on a second frequency band centered on a second frequency and comprising one of the plurality of channels, wherein the second frequency band is narrower than and overlapped by the first frequency band and wherein the first frequency is different from the second frequency, and wherein the second receiver subsystem is configured to be selectively tuned to the one of the plurality of channels; and
   a controller configured to:
      monitor the first frequency band using the first receiver subsystem; and
      if a wakeup signal is detected using the first receiver subsystem, connect the second receiver subsystem to the signal input and tune the second receiver subsystem to a channel transmitted in the wakeup signal, the wakeup signal including channel selection information defining the channel for subsequent communications.

2. The receiver of claim 1, wherein
   the first receiver subsystem comprises a super-regenerative receiver configured to down convert the signals received on the first frequency band to a baseband frequency; and the second receiver subsystem comprises a receiver configured to down convert the signals received on the second frequency band to a predetermined intermediate frequency.

3. The receiver of claim 2, further comprising:
a band-pass filter coupled to the signal input and configured to pass signals transmitted on the first frequency band, including the signals transmitted on the second frequency band; and
a low-noise amplifier coupled to the band-pass filter and configured to amplify the signals passed by the band-pass filter;
and wherein the first receiver subsystem and the second receiver subsystem are coupled to the signal input via a switch coupled to the low-noise amplifier, the switch configured to switchably connect the first receiver subsystem or the second receiver subsystem to the signal input.

4. The receiver of claim 3, further comprising:
a reference oscillator, and
a phase-locked loop coupled to the reference oscillator and coupled to the first receiver subsystem and the second receiver subsystem.

5. The receiver of claim 1, wherein the controller is configured to use the second receiver subsystem to sequentially monitor the plurality of channels if a predetermined level of interference is present on the first frequency band.

6. The receiver of claim 1, wherein the controller is configured to use the first receiver subsystem to receive beacon communications if less than a predetermined level of interference is present on the first frequency band.

7. A method, comprising:
receiving signals transmitted on a first frequency band centered on a first frequency using a first receiver subsystem coupled to a signal input, the first frequency band comprising a plurality of channels;
receiving signals transmitted on a second frequency band centered on a second frequency using a second receiver subsystem coupled to the signal input and configured to be tuned to the second frequency band, the second frequency band comprising one of the plurality of channels, wherein the second frequency band is narrower than and overlapped by the first frequency band and wherein the first frequency is different from the second frequency;
monitoring the first frequency band using the first receiver subsystem;
connecting the second receiver subsystem to the signal input if a wakeup signal is detected using the first receiver subsystem, the wakeup signal transmitting channel selection information defining a channel for subsequent communications; and
tuning the second receiver subsystem to the channel transmitted in the wakeup signal.

8. The method of claim 7, wherein
the first receiver subsystem comprises a super-regenerative receiver down converting the signals received on the first frequency band to a baseband frequency; and
the second receiver subsystem comprises a receiver down converting the signals received on the second frequency band to a predetermined intermediate frequency.

9. The method of claim 8, further comprising
passing signals transmitted on the first frequency band by a band-pass filter coupled to the signal input; and
amplifying the signals passed by the band-pass filter using a low-noise amplifier coupled to the band-pass filter,
wherein the first receiver subsystem and the second receiver subsystem are coupled to the signal input via a switch coupled to the low-noise amplifier, the switch electrically coupling the low-noise amplifier to either the first receiver subsystem or the second receiver subsystem.

10. The method of claim 9, further comprising:
processing the signals received on the first frequency band and signals received on the second frequency band using a phase locked loop, said phase-locked loop coupling to a reference oscillator and also coupling to the first receiver subsystem and the second receiver subsystem.

11. The method of claim 7, wherein a controller performs the monitoring of the first frequency band using the first receiver subsystem,
the connecting of the second receiver subsystem to the signal input and the tuning of the second receiver subsystem to the channel.

12. The method of claim 11, wherein the controller is configured to use the second receiver subsystem to sequentially monitor the plurality of channels if a predetermined level of interference is present on the first frequency band.

13. The method of claim 11, wherein the controller is configured to use the first receiver subsystem to receive beacon communications if less than a predetermined level of interference is present on the first frequency band.

14. A receiver, comprising:
a signal input;
a first receiver subsystem coupled to the signal input and configured to receive signals transmitted on a first frequency band;
a second receiver subsystem coupled to the signal input and configured to receive signals transmitted on a second frequency band;
wherein the second frequency band is narrower than and overlapped by the first frequency band; and
a controller configured to monitor the first frequency band using the first receiver subsystem and, if a wakeup signal is detected using the first receiver subsystem, connect the second receiver subsystem to the signal input;
wherein the first frequency band comprises a plurality of channels and the second frequency band comprises one of the plurality of channels;
the second radio subsystem is configured to be selectively tuned to the one of the plurality of channels;
the wakeup signal includes channel selection information defining a channel for subsequent communications; and
the controller is configured to tune the second receiver subsystem to the channel transmitted in the wakeup signal.

15. The receiver of claim 14, wherein the first receiver subsystem comprises a super-regenerative receiver configured to down convert the signals received on the first frequency band to a baseband frequency; and
the second receiver subsystem comprises a narrow-band receiver configured to down convert the signals received on the second frequency band to a predetermined intermediate frequency.

16. The receiver of claim 15, further comprising:
a band-pass filter coupled to the signal input and configured to pass signals transmitted on the first frequency band, including the signals transmitted on the second frequency band; and
a low-noise amplifier coupled to the band-pass filter and configured to amplify the signals passed by the band-pass filter;
and wherein the first receiver subsystem and the second receiver subsystem are coupled to the signal input via a switch coupled to the low-noise amplifier, the switch configured to switchably connect the first receiver subsystem or the second receiver subsystem to the signal input.

17. The receiver of claim 16, further comprising:
a reference oscillator; and
a phase-locked loop coupled to the reference oscillator and coupled to the first receiver subsystem and the second receiver subsystem.

18. The receiver of claim 14, wherein the controller is configured to use the second receiver subsystem to sequentially monitor the plurality of channels if a predetermined level of interference is present on the first frequency band.

19. The receiver of claim 14, wherein the controller is configured to use the first receiver subsystem to receive beacon communications if less than a predetermined level of interference is present on the first frequency band.

20. The receiver of claim 14, wherein the first frequency band includes the entire second frequency band.

\* \* \* \* \*